Patented Apr. 17, 1934

1,955,417

UNITED STATES PATENT OFFICE 1,955,417

PRODUCTION OF ALCOHOLS

William Engs and Richard Z. Moravec, Berkeley, Calif., assignors to Shell Development Company, San Francisco, Calif., a corporation of Delaware No Drawing. Application February 7, 1933, Serial No. 655,618

17 Claims. (Cl. 260—156)

This invention relates to a process for the manufacture of alcohols from the corresponding sulfuric esters or like esters obtained in the well-known way by absorbing olefines in sulfuric acid or other suitable acids, such as phosphoric or sulfonic acids.

The process, according to the invention, is particularly advantageous in that it allows alcohols and a valuable by-product to be produced in an economical manner, as will be described hereinafter.

It is known that alcohols are formed by absorbing olefines in acid and hydrolyzing the acid reaction liquid by dilution with water, after which the alcohol is distilled off.

It has been observed that the secondary alcohols are in part destroyed by the action of the acid in the reaction liquid, even when the liquid is diluted to a high degree, so that on subjecting the diluted reaction liquid to distillation, the yield of alcohols is considerably reduced. In order to overcome this drawback it has already been proposed to neutralize the acid reaction liquid before distilling, for instance with lime. Lime, however, has the drawback that with the acids, it yields calcium salts, which are insoluble and therefore hinders the proper distillation of the alcohols.

According to the present process, the above-mentioned disadvantages are overcome and further advantages are obtained, which will be illustrated hereinafter.

According to the invention, the process for the hydrolysis of esters comprises diluting the strongly acid solution of ester as obtained with water, ammonia, basic salts or the like whereby the free acid content is reduced to a point most favorable for hydrolysis—between about 40 to 50% (calculated as total titratable hydrogen expressed in terms of $H_2SO_4$). The dilute acid liquor is heated to and maintained at a temperature whereat the ester is not decomposed to the original olefine or polymer. The maximum temperature is employed in order to effect hydrolysis in the shortest time interval without distillation of the alcohol—not to exceed 45° C. because above this temperature appreciable losses of olefine occur. Hydrolyzation of the ester is thus effected at a much higher acidity and lower temperature than formerly. After a time, equilibrium would be attained in the system comprising ester, water, acid and alcohol, according to the reaction:

acid ester + water ⇌ alcohol + acid.

The mixture which has been hydrolyzed to the equilibrium condition, as described above, is now completely neutralized with a basic material, which is substantially insoluble or difficultly insoluble in the alcohol as such or as a salt of the free acid, although in certain instances it may be desirable to avoid complete neutralization of the free acid. Ammonia in the gaseous, liquid, aqueous or anhydrous state may be employed as the basic material as may basic salts of ammonia, as ammonium carbonate, ammonium carbamate and the like as well as caustic alkali and other alkaline compounds as solids or solutions.

The mixture is permitted to stratify into two phases. The alcoholic phase contains practically all of the alcohol and unhydrolyzed mono-sulfate while the non-alcoholic phase comprises a solution of a plurality of ammonium salts, if solutions of ammonium salts have been utilized to neutralize the acid liquor. Where other basic material is employed, it will be found in the non-alcoholic phase in the form of a solution of its salt; the type of salt depending on the acidic character of the ester being hydrolyzed. For example, the non-alcoholic phase can comprise a saturated solution of ammonium sulfate if about 25% aqua ammonia has been added, and in addition, solid ammonium sulfate if stronger aqua ammonia or anhydrous ammonia has been used. If the two phases are separated before distilling off all the alcohol, the non-alcoholic phase is quite clear and practically free from carbon compounds.

The non-alcoholic phase which contains only about 1% of the total available alcohol is now ready for the recovery of the salt formed, for instance ammonium sulfate. The alcoholic phase is preferably acidified to about 5 to 20 per cent acidity and distilled to hydrolyze the remaining mono-sulfate and to recover alcohol.

For purpose of illustration only, reference will be had to the hydrolysis of butyl hydrogen sulfate in acid solution which has been formed by absorbing the corresponding olefine in sulfuric acid although it is to be understood that the process is by no means restricted to the manufacture of particular alcohols as it is particularly advantageous for the production of secondary alcohols which are apt to be destroyed when distilled in the presence of even dilute acid.

Butyl hydrogen sulfate liquor as customarily obtained by the absorption of the corresponding olefine in sulfuric acid is very strongly acid, running well above 50% acidity (total titratable hydrogen expressed in terms of $H_2SO_4$). The strong acid sulfate liquor is diluted with water to between about 40 to 50% acidity, instead of 10 to 15% acidity which is the dilution necessary to prevent serious decomposition of the ester when hydrolysis is carried out by distilling the alcohol from acid solutions, thereby reducing the volume of dilution water from about 3 gallons/gallon butyl hydrogen sulfate to about 0.3 gallons/gallon butyl hydrogen sulfate.

The diluted butyl hydrogen sulfate liquor is introduced into a hydrolyzing tank, where it is hydrolyzed to equilibrium conditions at a temperature not exceeding 45° C. Any dibutyl sulfate present is hydrolyzed with the butyl hydrogen sulfate. If the diluted mixture is permitted to stand at room temperature, equilibrium is reached in about 36 hours with 35 per cent of the available alcohol remaining as butyl hydrogen sulfate; at 40° C., equilibrium is reached in 5 hours with 22% of the alcohol combined as butyl hydrogen sulfate. The reaction is very easily carired out with attention being paid only to the temperature of the hydrolyzing mixture, between the limits 40 to 50% acidity, the temperature ranging inversely from 45° C. downwards, the exact lower operating temperature depending on the time it is desired to have the mixture undergoing hydrolysis to equilibrium. The hydrolyzed mass is allowed to stratify just before neutralization in order to remove small amounts of polymer.

The equilibrium mixture is neutralized with ammonia and the mixture permitted to stratify into two phases. The non-alcoholic phase is worked up in the usual manner for the recovery of ammonium sulfate. The alcoholic phase is acidified to about 10 to 15% acidity and distilled to hydrolyze the remaining mono-sulfate (butyl ammonium sulfate) and to recover the alcohol which is fed to a series of rectification columns for further purification and dehydration.

Cooling or heating units may be employed in, on or auxiliary to the hydrolyzing tank to maintain the temperature of the mixture within the vessel at or below 45° C.

This method of operation offers the following advantages: An increase in alcohol yield of from 5 to 10% over the yield obtainable by hydrolyzing and distilling the alcohol-acid solutions—by a reduction in the decomposition to butylene durhydrolysis; an over 60% reduction in the volume of dilute butyl hydrogen sulfate; a large reduction in volume of material to be handled in converting the waste acid to ammonium sulfate; hydrolyzation of the butyl hydrogen sulfate at a much higher acidity and lower temperature than formerly; acid bottoms which contain clear ammonium sulfate as the impurities are in the alcohol layer and removed therefrom during rectification whereas the impurities experienced in the normal cause of procedure with dilute $H_2SO_4$ are difficult to remove; ease of control since the temperature during hydrolysis is the only factor to be checked; elimination of corrosion difficulties with higher acidities and the abilty to use steel equipment up to the point of neutralization; and increased reaction rates with higher acidities.

In this way, valuable by-products, for instance, ammonium sulfate or ammonium phosphate, which may serve as constituents of artificial manner, may be obtained according to the present process with hardly any additional cost.

The process can be carried out with any of the esters of the olefines capable of forming secondary alcohols upon hydrolysis and is not dependent upon the particular number of carbon atoms contained in each olefinic molecule as it can be practiced with the esters of propylene, butylene, amylene, hexylene and the like. If desired, the process can be executed with mixtures of the esters to form suitable mixtures of the corresponding alcohols.

The source of the olefinic material is not of importance and suitable ones are petroleum and petroleum products which have been cracked, as well as other natural carbonaceous material as shale, coal, tar and the like which have been subjected to suitable pyrolytic treatment.

This case is a continuation in part of Serial No. 564,472 filed September 22, 1931.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for hydrolyzing an alkyl acid ester of a polybasic mineral acid in aqueous acid solution which comprises adjusting the free acid content of the ester solution to about 40 to 50% acidity (calculated as total titratable hydrogen expressed in terms of $H_2SO_4$), hydrolyzing the acid solution at a temperature not exceeding 45° C. until an equilibrium is attained between the ester and water and the hydrolyzation products, reducing the free acid content to a value substantially below that maintained during hydrolysis and recovering the alcohol formed.

2. A process for hydrolyzing an alkyl acid ester of a polybasic mineral acid in aqueous acid solution which comprises hydrolyzing the acid solution at a temperature not exceeding 45° C. and with an acidity of about 40 to 50% (calculated as total titratable hydrogen expressed in terms of $H_2SO_4$) until an equilibrium is attained between the ester and water and the hydrolyzation products, reducing the free acid content to a value substantially below that maintained during hydrolysis and recovering the alcohol formed.

3. A process for hydrolyzing an alkyl acid ester of a polybasic mineral acid in aqueous acid solution which comprises hydrolyzing the acid solution at a temperature not exceeding 45° C. and with an acidity of about 40 to 50% (calculated as total titratable hydrogen expressed in terms of $H_2SO_4$) until an equilibrium is attained between the ester and water and the hydrolyzation products, neutralizing the free acid content and recovering the alcohol formed.

4. A process for hydrolyzing an alkyl acid ester of a polybasic mineral acid in aqueous acid solution which comprises hydrolyzing the acid solution at a temperature not exceeding 45° C. and with an acidity of about 40 to 50% (calculated as total titratable hydrogen expressed in terms of $H_2SO_4$) until an equilibrium is attained between the ester and water and the hydrolyzation products, neutralizing the free acid content and separating the resulting alcoholic phase from the non-alcoholic phase.

5. A process for hydrolyzing an alkyl acid ester of a polybasic mineral acid in aqueous acid solution which comprises hydrolyzing the acid solution at a temperature not exceeding 45° C. and with an acidity of about 40 to 50% (calculated as total titratable hydrogen expressed in terms of $H_2SO_4$) until an equilibrium is attained between the ester and water and the hydrolyzation products, neutralizing the free acid content, separating the resulting alcoholic phase from the non-alcoholic phase, acidifying the former to about 10 to 15% acidity and distilling to recover alcohol.

6. A process for hydrolyzing an alkayl acid ester of a polybasic mineral acid in aqueous acid solution which comprises hydrolyzing the acid solution at a temperature not exceeding 45° C. and with an acidity of about 40 to 50% (calculated as total titratable hydrogen expressed in terms of $H_2SO_4$) until an equilibrium is attained between the ester and water and the hydrolyzation products, reducing the free acid content to a value substantially below that maintained during hydrolysis by the addition of an inorganic basic material and recovering the alcohol formed.

7. A process for hydrolyzing an alkyl acid ester of a polybasic mineral acid in aqueous acid solution which comprises hydrolyzing the acid solution at a temperature not exceeding 45° C. and with an acidity of about 40–50% (calculated as total titratable hydrogen expressed in terms of $H_2SO_4$) until an equilibrium is attained between the ester and water and the hydrolyzation products, neutralizing the free acid content with a compound of the class consisting of ammonia and basic salts of ammonia and recovering the alcohol formed.

8. A process for hydrolyzing an alkyl acid ester of a polybasic mineral acid in aqueous acid solution which comprises hydrolyzing the acid solution at a temperature not exceeding 45° C. and with an acidity of about 40 to 50% (calculated as total titratable hydrogen expressed in terms of $H_2SO_4$) until an equilibrium is attained between the ester and water and the hydrolyzation products, reducing the free acid content to a value substantially below that maintained during hydrolysis by addition to the hydrolytic mixture of an inorganic basic material which is substantially soluble in the alcohol as such or as a salt, and recovering the alcohol formed.

9. A process for hydrolyzing butyl hydrogen sulfate in aqueous sulfuric acid which comprises hydrolyzing the acid solution at a temperature not exceeding 45° C. and with an acidity of about 40 to 50% (calculated as total titratable hydrogen expressed in terms of $H_2SO_4$) until an equilibrium is attained between the ester and water and the hydrolyzation products, neutralizing the free sulfuric acid and recovering the alcohol formed.

10. A process for hydrolyzing butyl hydrogen sulfate in aqueous sulfuric acid which comprises hydrolyzing the acid solution at a temperature not exceeding 45° C. and with an acidity of about 40 to 50% (calculated as total titratable hydrogen as expressed in terms of $H_2SO_4$) until an equilibrium is attained between the ester and water and the hydrolyzation products, neutralizing the free acid content with ammonia whereby the hydrolytic mixture stratifies into two phases, acidifying the alcoholic phase to about 10 to 15% acidity and distilling to recover secondary butyl alcohol.

11. A process for hydrolyzing an acid liquor comprising olefines absorbed in a polybasic mineral acid and of about 40 to 50% acidity, calculated as total titratable hydrogen expressed in terms of $H_2SO_4$, which comprises heating the acid liquor to a temperature below that at which ester material in the acid liquor is substantially decomposed until substantial equilibrium is attained between the ester material, water and the hydrolyzation products, reducing the free acid content to a value substantially below that maintained during hydrolysis and recovering the alcohol formed.

12. A process of hydrolyzing an acid liquor comprising secondary olefines containing at least four carbon atoms to the molecule absorbed in a polybasic mineral acid and of about 40 to 50% acidity, calculated as total titratable hydrogen expressed in terms of $H_2SO_4$, which comprises heating the acid liquor to a temperature below that at which ester material in the acid liquor is substantially decomposed until substantial equilibrium is attained between the ester material, water and the hydrolyzation products, reducing the free acid content to a value substantially below that maintained during hydrolysis and recovering the alcohol formed.

13. A process for hydrolyzing an acid liquor comprising secondary butylene absorbed in sulfuric acid and of about 40 to 50% acidity, calculated as total titratable hydrogen expressed in terms of $H_2SO_4$, which comprises heating the sulfuric acid liquor to a temperature below that at which ester material in the acid liquor is substantially decomposed until substantial equilibrium is attained between the ester material, water and the hydrolyzation products, reducing the free acid content to a value substantially below that maintained during hydrolysis and recovering the alcohol formed.

14. A process for hydrolyzing an acid liquor comprising secondary olefines containing at least four carbon atoms to the molecule absorbed in sulfuric acid and of about 40 to 50% acidity, calculated as total titratable hydrogen expressed in terms of $H_2SO_4$, which comprises heating the acid liquor to a temperature below that at which ester material in the acid liquor is substantially decomposed until substantial equilibrium is attained between the ester material, water and the hydrolyzation products, effecting stratification of the hydrolytic mixture into a substantially alcoholic and a substantially non-alcoholic phase and recovering alcohol from the former.

15. A process of hydrolyzing an acid liquor comprising secondary olefines containing at least four carbon atoms to the molecule absorbed in sulfuric acid and of about 40 to 50% acidity, calculated as total titratable hydrogen expressed in terms of $H_2SO_4$, which comprises heating the acid liquor to a temperature below that at which ester material in the acid liquor is substantially decomposed until substantial equilibrium is attained between the ester material, water and the hydrolyzation products, stratifying and removing a polymer phase from the hydrolytic mixture and effecting stratification of the hydrolytic mixture by the introduction therein of an inorganic basic agent.

16. A process for hydrolyzing an acid liquor comprising secondary olefines containing at least four carbon atoms to the molecule absorbed in sulfuric acid and of about 40 to 50% acidity, calculated as total titratable hydrogen expressed in terms of $H_2SO_4$, which comprises heating the acid liquor to a temperature below that at which ester material in the acid liquor is substantially decomposed until substantial equilibrium is attained between the ester material, water and the hydrolyzation products, and effecting stratification of the hydrolytic mixture by the introduction therein of a compound of the class consisting of ammonia and basic salts of ammonia.

17. A process for hydrolyzing an acid liquor comprising secondary olefines containing at least four carbon atoms to the molecule absorbed in sulfuric acid and of about 40 to 50% acidity, calculated as total titratable hydrogen expressed in terms of $H_2SO_4$, which comprises heating the acid liquor to a temperature below that at which ester material in the acid liquor is substantially decomposed until substantial equilibrium is attained between the ester material, water and the hydrolyzation products, effecting stratification of the hydrolytic mixture into an alcoholic phase and a non-alcoholic phase, adjusting the acidity of the former to about 5 to 20% acidity and distilling to recover alcohol.

WILLIAM ENGS.
RICHARD Z. MORAVEC.